United States Patent
Kohli et al.

(10) Patent No.: US 8,394,155 B2
(45) Date of Patent: Mar. 12, 2013

(54) THERMALLY STABILIZED BAG HOUSE FILTERS AND MEDIA

(76) Inventors: Anil Kohli, Midlothian, VA (US); Antoine Schelling, Geneva (CH); Kurt Hans Wyss, Chavannes de Bogis (CH); B. Lynne Wiseman, Richmond, VA (US); Young H Kim, Hockessin, DE (US); Hageun Suh, Chadds Ford, PA (US)

( * ) Notice: Subject to any disclaimer, the term of this patent is extended or adjusted under 35 U.S.C. 154(b) by 458 days.

(21) Appl. No.: 12/266,770

(22) Filed: Nov. 7, 2008

(65) Prior Publication Data

US 2009/0255226 A1    Oct. 15, 2009

Related U.S. Application Data

(60) Provisional application No. 61/002,605, filed on Nov. 9, 2007.

(51) Int. Cl.
*B01D 46/02* (2006.01)

(52) U.S. Cl. ........... 55/382; 55/486; 55/524; 55/DIG. 2; 15/347

(58) Field of Classification Search .................. 55/486, 55/487, 382, 528, DIG. 2, DIG. 5; 15/347; 96/66, 68; 264/258, DIG. 48; 442/389
See application file for complete search history.

(56) References Cited

U.S. PATENT DOCUMENTS

| | | | |
|---|---|---|---|
| 3,431,611 | A | 3/1969 | Rentz |
| 4,127,706 | A | 11/1978 | Martin et al. |
| 4,174,358 | A | 11/1979 | Epstein |
| 4,410,661 | A | 10/1983 | Epstein et al. |
| 4,478,978 | A | 10/1984 | Roura |
| 4,554,320 | A | 11/1985 | Reimann et al. |
| 4,556,601 | A | 12/1985 | Kirayoglu |
| 4,955,116 | A | 9/1990 | Hayaminzu et al. |
| 4,983,434 | A | 1/1991 | Sassa |
| 5,080,702 | A | 1/1992 | Bosses |
| 5,171,339 | A | 12/1992 | Forsten |
| 6,740,142 | B2 | 5/2004 | Buettner et al. |
| 7,115,151 | B2 * | 10/2006 | Smithies et al. ............ 55/528 |
| 7,318,852 | B2 | 1/2008 | Chung et al. |
| 7,727,915 | B2 * | 6/2010 | Skirius et al. ............... 442/389 |
| 7,837,009 | B2 | 11/2010 | Gross et al. |
| 7,878,301 | B2 | 2/2011 | Gross et al. |
| 7,918,313 | B2 | 4/2011 | Gross et al. |
| 2001/0042361 | A1 * | 11/2001 | Cox et al. .................... 55/382 |
| 2005/0193696 | A1 * | 9/2005 | Muller et al. ................ 55/486 |
| 2007/0144124 | A1 * | 6/2007 | Schewe et al. .............. 55/487 |
| 2007/0207317 | A1 | 9/2007 | Willingham et al. |
| 2008/0022645 | A1 | 1/2008 | Skirius et al. |
| 2008/0307971 | A1 * | 12/2008 | Horie et al. ................. 95/287 |
| 2009/0019825 | A1 * | 1/2009 | Skirius et al. ............... 55/521 |
| 2009/0071113 | A1 * | 3/2009 | Oba et al. .................... 55/486 |

FOREIGN PATENT DOCUMENTS

| | | |
|---|---|---|
| WO | 03/080905 A1 | 10/2003 |
| WO | 2006107847 | 10/2006 |

OTHER PUBLICATIONS

PCT International Search Report and Written Opinion for International Application No. PCT/US2008/082770 dated Nov. 7, 2008.
Kohli et al., U.S. Appl. No. 61/002,605, filed Nov. 9, 2007.
Skirius et al., U.S. Appl. No. 60/950,269, filed Jul. 17, 2007.
Gross et al., U.S. Appl. No. 60/947,266, filed Jun. 29, 2007.
Skirius et al., U.S. Appl. No. 60/880,873, filed Jan. 16, 2007.
Gross et al., U.S. Appl. No. 60/848,105, filed Sep. 29, 2006.
Gross et al., U.S. Appl. No. 60/817,749, filed Jun. 30, 2006.
Skirius et al., U.S. Appl. No. 60/760,323, filed Jan. 18, 2006.
Gross et al., U.S. Appl. No. 60/729,264, filed Oct. 21, 2005.
Boehmer et al., U.S. Appl. No. 60/667,873, filed Apr. 1, 2005.
ES Fibervisions, AL-Adhesion-C—Improved Airlaid Fiber, Apr. 2010, MD.41.40.00-ver05.
Units of Textile Measurement, http.//en.wikipedia.org/wiki, website visited Sep. 10, 2012.

* cited by examiner

*Primary Examiner* — Duane Smith
*Assistant Examiner* — Minh-Chau Pham
(74) *Attorney, Agent, or Firm* — Andrus, Sceales, Starke & Sawall, LLP

(57) ABSTRACT

A bag filter having a support structure clothed in a filter bag. The cloth of the filter bag is a composite of at least one substrate layer and at least one nanoweb bonded thereto in a face-to-face relationship. The nanoweb is positioned at the surface of the filter bag first exposed to the hot particle laden gas stream and can have a basis weight of greater than about 0.1 gsm.

15 Claims, No Drawings

THERMALLY STABILIZED BAG HOUSE FILTERS AND MEDIA

CROSS-REFERENCE TO RELATED APPLICATION

This application claims priority under 35 U.S.C. §119 from U.S. Provisional Application Ser. No. 61/002,605 (filed Nov. 9, 2007), the disclosure of which is incorporated by reference herein for all purposes as if fully set forth.

FIELD OF THE INVENTION

This invention relates filters and to composites useful as filters in filtration of solids from fluid streams, as, for example, in industrial gas streams.

BACKGROUND

Dust collectors, also known as bag houses, are generally used to filter particulate material from industrial effluent or off-gas. Once filtered, the cleaned off-gas can be vented to the atmosphere or recycled. Such a bag house dust collector structure generally includes one or more flexible filter banks supported within a cabinet or similar structure. In such a filter cabinet and bank, the filter bag is generally secured within the cabinet and maintained in a position such that effluent efficiently passes through the bag thereby removing entrained particulates. The filter bag, secured within the cabinet, is typically supported by a structure that separates the upstream and downstream air and supports the filter bag to maintain efficient operation.

More specifically, in a so-called "baghouse filter", particulate material is removed from a gaseous stream as the stream is directed through the filter media. In a typical application, the filter media has a generally sleeve-like tubular configuration, with gas flow arranged so as to deposit the particles being filtered on the exterior of the sleeve. In this type of application, the filter media is periodically cleaned by subjecting the media to a pulsed reverse-flow, which acts to dislodge the filtered particulate material from the exterior of the sleeve for collection in the lower portion of the baghouse filter structure. U.S. Pat. No. 4,983,434 illustrates a baghouse filter structure and a prior art filter laminate.

The separation of particulate impurities from industrial fluid streams is often accomplished using fabric filters. These textile based filter media remove particulate from the fluids. When the resistance to flow or pressure drop through the textile caused by accumulation of particulate on the filter becomes significant, the filter must be cleaned, and the particulate cake removed.

It is common in the industrial filtration market to characterize the type of filter bag by the method of cleaning. The most common types of cleaning techniques are reverse air, shaker and pulse jet. Reverse air and shaker techniques are considered low energy cleaning techniques.

The reverse air technique is a gentle backwash of air on a filter bag which collects dust on the interior. The back wash collapses the bag and fractures dust cake which exits the bottom of the bag to a hopper.

Shaker mechanisms clean filter cake that collects on the inside of a bag as well. The top of the bag is attached to an oscillating arm which creates a sinusoidal wave in the bag to dislodge the dust cake.

Pulse jet cleaning techniques employs a short pulse of compressed air that enters the interior top portion of the filter tube. As the pulse cleaning air passes through the tube venturi it aspirates secondary air and the resulting air mass violently expands the bag and casts off the collected dust cake. The bag will typically snap right back to the cage support and go right back into service collecting particulate.

Of the three cleaning techniques the pulse jet is the most stressful on the filter media. However, in recent years industrial process engineers have increasingly selected pulse jet baghouses.

The need for high temperature (up to 200° C.), thermally stable, chemically resistant filter media in baghouses narrows the choice of filter media to only a few viable candidates for pulse jet applications. Common high temperature textiles comprise polytetrafluoroethylene (PTFE), fiberglass, or polyimides (polyimides are stable for continuous use to 260° C.). When the effect of high temperature is combined with the effect of oxidizing agents, acids or bases, there is a tendency for fiberglass and polyimide media to fail prematurely. Thus, there is a preference for using PTFE. Commercially available PTFE fabrics are supported needlefelts of PTFE fiber. These felts usually weight from 20-26 oz/yd$^2$ and are reinforced with a multifilament woven scrim (4-6 oz/yd$^2$). The felts are made up of staple fibers, (usually 6.7 denier/filament, or 7.4 dtex/filament) and 2-6 inches in length. This product works similarly to many other felted media in that a primary dust cake "seasons" the bag. This seasoning, sometimes called in-depth filtration, causes the media to filter more efficiently but has a drawback in that the pressure drop increases across the media during use. Eventually the bag will blind or clog and the bags will have to be washed or replaced. In general, the media suffers from low filtration efficiency, blinding and dimensional instability (shrinkage) at high temperatures.

Another type of structure designed for high temperatures is described in U.S. Pat. No. 5,171,339. A bag filter is disclosed that comprises a bag retainer clothed in a filter bag. The cloth of said filter bag comprises a laminate of a felt of poly(m-phenylene isophthalamide), polyester or polyphenylene-sulfide fibers having a thin nonwoven fabric of poly(p-phenylene terephthalamide) fibers needled thereto, the poly(p-phenylene terephthalamide) fabric being positioned at the surface of the filter bag first exposed to the hot particle laden gas stream. The poly(p-phenylene terephthalamide) fabric can have a basis weight of from 1 to 2 oz/yd$^2$.

A two layer product of porous expanded PTFE membrane (ePTFE) laminated to woven porous expanded PTFE fiber fabric has also been used. Commercial success of this product has not been realized due to several reasons, but primarily due to the woven fiber fabric backing not wearing well on the pulse jet cage supports. The woven yarns slide on themselves and create excessive stress on the membrane, resulting in membrane cracks.

Nonwoven fabrics have been advantageously employed for manufacture of filter media. Generally, nonwoven fabrics employed for this type of application have been entangled and integrated by mechanical needle-punching, sometimes referred to as "needle-felting", which entails repeated insertion and withdrawal of barbed needles through a fibrous web structure. While this type of processing acts to integrate the fibrous structure and lend integrity thereto, the barbed needles inevitably shear large numbers of the constituent fibers, and undesirably create perforations in the fibrous structure, which act to compromise the integrity of the filter and can inhibit efficient filtration. Needle-punching can also be detrimental to the strength of the resultant fabric, requiring that a suitable nonwoven fabric have a higher basis weight in order to exhibit sufficient strength for filtration applications.

U.S. Pat. No. 4,556,601 to Kirayoglu discloses a hydroentangled, nonwoven fabric, which may be used as a heavy-duty gas filter. This filtration material however, cannot be subjected to a shrinkage operation. Exposure of the described fabric to a shrinkage operation is believed to have a negative effect on the physical performance of the filtration material.

U.S. Pat. No. 6,740,142 discloses nanofibers for use in baghouse filters. A flexible bag is at least partially covered by a layer having a basis weight of 0.005 to 2.0 grams per square meter (gsm) and a thickness of 0.1 to 3 microns. The layer comprises a polymeric fine fiber with a diameter of about 0.01 to about 0.5 micron, but is limited in basis weight due to the limitations of the process used to produce it. The limitation in basis weight of the layer in the '142 patent significantly reduces the lifetime of the filter medium and severely reduces the ability of the filter to survive cleaning cycles.

SUMMARY OF THE INVENTION

A first embodiment of the present invention is a bag filter comprising a support structure clothed in a filter bag, the cloth of said filter bag comprising a composite of at least one substrate layer and a first nanoweb layer having a basis weight of greater than about 0.1 gsm bonded thereto in a face-to-face relationship. The nanoweb comprises nanofibers spun from a polyamide incorporating an effective amount of an antioxidant.

Another embodiment of the present invention is a bag filter comprising a support structure clothed in a filter bag, the cloth of said filter bag comprising a composite of a first substrate layer bonded in a face to face relationship to a nanoweb layer having a basis weight of greater than about 0.1 gsm and a second substrate layer bonded to the nanoweb layer, wherein the nanoweb is positioned on the upstream side of the filter bag. The nanoweb comprises polyamide nanofibers incorporating an effective amount of an antioxidant.

DETAILED DESCRIPTION

The present invention is directed to a filter media which is formed through bonding of a nanoweb layer to a substrate by hydroentanglement, needle punching, or other bonding means. This construction provides a filter media having the requisite strength characteristics, without possessing the limited performance of the product of U.S. Pat. No. 6,740,142. The filtration media of the present invention also demonstrates a highly desirable uniformity for cost-effective use and stability over long periods of use.

The term "nanofiber" as used herein refers to fibers having a number average diameter or cross-section less than about 1000 nm, even less than about 800 nm, even between about 50 nm and 500 nm, and even between about 100 and 400 nm. The term diameter as used herein includes the greatest cross-section of non-round shapes.

The term "nonwoven" means a web including a multitude of randomly distributed fibers. The fibers generally can be bonded to each other or can be unbonded. The fibers can be staple fibers or continuous fibers. The fibers can comprise a single material or a multitude of materials, either as a combination of different fibers or as a combination of similar fibers each comprised of different materials. A "nanoweb" is a nonwoven web that comprises nanofibers.

A "substrate" is a support layer and can be any planar structure to which the nanoweb layer can be bonded, adhered or laminated. Advantageously, the substrate layers useful in the present invention are spunbond nonwoven layers, but can be made from carded webs of nonwoven fibers and the like.

By "effective amount" of antioxidant is meant an amount that provides the desired level of thermal stability to the filter as measured by physical or visual properties.

The object of the present invention is to provide a thermally stable, high-efficiency dust-collecting filter cloth for bag filter units for exhaust gas dust collection, and to provide a bag filter comprising the filter cloth. The filter includes at least one nanoweb layer in combination with at least one substrate layer in a mechanically stable filter structure. These layers together provide excellent filtering and high particle capture efficiency at minimum fluid flow restriction through the filter media. The substrate can be positioned in the fluid stream upstream, downstream or in an internal layer.

In one embodiment the filter comprises a filtration medium including a thermally-stabilized nanoweb layer having a basis weight of greater than about 0.1 gsm, or greater than about 0.5 gsm, or greater than about 5 gsm, or even greater than about 10 gsm and up to about 90 gsm. The filtration medium further comprises a substrate to which the nanoweb is bonded in a face-to-face relationship. Advantageously, the nanoweb layer is positioned on the upstream surface or side of the filter bag, i.e. on the surface which is first exposed to the hot, particle-laden gas stream.

In a further embodiment the filter comprises a composite of a first substrate layer having a thermally-stabilized nanoweb bonded thereto in a face-to-face relationship, the nanoweb being positioned on the upstream side of the filter bag, i.e. at the surface of the filter bag first exposed to the hot, particle-laden gas stream, wherein the nanoweb has a basis weight of greater than about 0.1 gsm, and a second substrate layer bonded to the nanoweb layer. In some cases it is advantageous that the second substrate layer is positioned in between the nanoweb and the first substrate layer, while in other cases it is desirable that the nanoweb layer be positioned between the first and second substrate layers.

Polymers useful for electroblowing nanofiber webs of the present invention are polyamides (PA), and preferably a polyamide selected from the group consisting of polyamide 6, polyamide 6,6, polyamide 6,12, polyamide 11, polyamide 12, polyamide 4,6, a semi-aromatic polyamide (high temperature polyamide) and any combination or blend thereof. The polyamides (PA) used in preparing the blending composition of the invention are well known in the art. Representative polyamides include semicrystalline and amorphous polyamide resins of a molecular weight of at least 5,000 as described, for instance, in U.S. Pat. Nos. 4,410,661; 4,478,978; 4,554,320; and 4,174,358.

In accordance with the invention, polyamides obtained by copolymerization of two of the above polymers, by terpolymerization of the above polymers or their component monomers, e.g., a copolymer of adipic acid, isophthalic acid and hexamethylenediamine, or blended mixtures of polyamides such as a mixture of PA 6, 6 and PA 6 may also be used. Preferably, the polyamides are linear and have melting points or softening points above 200° C.

The polyamide used to spin the fibers comprises a thermal stability additive, such as an antioxidant. Suitable antioxidants for use in the invention are any materials that are soluble in the spinning solvent with the polyamide if the polyamide is spun from solution. Examples of such materials are copper halides and hindered phenols. By "hindered phenol" is meant a compound whose molecular structure contains a phenolic ring in which one or both of the carbon atoms cis to the hydroxyl moiety holds an alkyl group. The alkyl group is preferably a tertiary butyl moiety and both adjacent carbon atoms hold a tertiary butyl moiety.

Antioxidants that are useful for this invention include: phenolic amides such as N,N'-hexamethylene bis(3,5-di-(tert)-butyl-4-hydroxyhydrocinnamamide) (Irganox 1098); amines such as various modified benzenamines (e.g. Irganox 5057); phenolic esters such as ethylenebis(oxyethylene)bis-(3-(5-tert-butyl-4-hydroxy-m-tolyl)-propionate (Irganox 245) (all available from Ciba Specialty Chemicals Corp., Tarrytown, N.Y.); organic or inorganic salts such as mixtures of cuprous iodide, potassium iodide, and zinc salt of octadecanoic acid, available as Polyad 201 (from Ciba Specialty Chemicals Corp., Tarrytown, N.Y.), and mixtures of cupric acetate, potassium bromide, and calcium salt of octadecanoic acid, available as Polyad 1932-41 (from Polyad Services Inc., Earth City, Mo.); hindered amines such as 1,3,5-triazine-2,4,6-triamine,N,N'''-[1,2-ethane-diyl-bis[[[4,6-bis-[butyl (1,2,2,6,6-pentamethyl-4-piperidinyl)amino]-1,3,5-triazine-2-yl]imino]-3,1-propanediyl]]bis[N',N''-dibutyl-N',N''-bis(1,2,2,6,6-pentamethyl-4-piperidinyl) (Chimassorb 119 FL), 1,6-hexanediamine, N,N'-bis(2,2,6,6-tetramethyl-4-piperidinyl)-polymer with 2,4,6-trichloro-1,3,5-triazine, reaction products with N-butyl-1-butanamine an N-butyl-2,2,6,6-tetramethyl-4-piperidinamine (Chimassorb 2020), and poly[[6-[(1,1,3,3-tetramethylbutyl)amino]-1,3,5-triazine-2,4-diyl][2,2,6,6-tetramethyl-4-piperidinyl)imino]-1,6-hexanediyl[(2,2,6,6-tetramethyl-4-piperidinyl)imino]]) (Chimassorb 944) (all available from Ciba Specialty Chemicals Corp., Tarrytown, N.Y.); polymeric hindered phenols such as 2,2,4 trimethyl-1,2 dihydroxyquinoline (Ultranox 254 from Crompton Corporation, a subsidiary of Chemtura Corporation, Middlebury, Conn., 06749); hindered phosphites such as bis(2,4-di-t-butylphenyl) pentaerythritol diphosphite (Ultranox 626 from Crompton Corporation, a subsidiary of Chemtura Corporation, Middlebury, Conn., 06749); and tris(2,4-di-tert-butyl-phenyl) phosphite (Irgafos 168 from Ciba Specialty Chemicals Corp., Tarrytown, N.Y.); 3-(3,5-di-tert-butyl-4-hydroxyphenyl)propionic acid (Fiberstab PA6, available from Ciba Specialty Chemicals Corp., Tarrytown, N.Y.), and combinations and blends thereof.

To achieve the desired improvement in filter performance, the concentration of the antioxidant agent used as stabilizer in the method of the invention is preferably between 0.01 and 10% by weight relative to the polyamide and especially preferably between 0.05 and 5% by weight. Especially good results are achieved if the concentration of antioxidant agent lies between 0.2 and 2.5% by weight relative to the polyamide used.

The filter of the invention can be used in a variety of filtration applications including pulse clean and non-pulse cleaned filters for dust collection, gas turbines and engine air intake or induction systems, gas turbine intake or induction systems, heavy duty engine intake or induction systems, light vehicle engine intake or induction systems, Zee filter, vehicle cabin air, off road vehicle cabin air, disk drive air, photocopier-toner removal, HVAC filters for both commercial or residential filtration applications, and vacuum cleaner applications.

The substrate layers of the invention can be formed from a variety of conventional fibers including cellulosic fibers such as cotton, hemp or other natural fibers, inorganic fibers including glass fibers, carbon fibers or organic fibers such as polyesters, polyimides, polyamides, polyolefins, or other conventional fibers or polymeric materials and mixtures thereof.

The substrate layers of the filter bag of the invention can be woven or non-woven. In woven bags, the fibers are typically formed into an interlocking mesh of fiber in a typical woven format. Non-woven fabrics are typically made by loosely forming the fibers in no particular orientation and then binding the fibers into a filter fabric. One preferred mode of constructing the elements of the invention includes using a felt media as a substrate. Felts are a compressed, porous, non-woven fabric made by laying discrete natural or synthetic fibers and compressing the fibers into a felt layer using commonly available felt bonding technology that would be known to one skilled in the art.

Fibers are typically used which result in fabrics that exhibit excellent resilience and resistance to the effects of the passage of air and the entrapment of particulates. The fabrics can have stability with respect to chemical particulates, and can be stable with respect to varying temperatures of both the air passing through the bag house and the temperature of the particulate entrained on the filter surface.

The filter structures of the invention are typically maintained in their useful open shape by supporting the substrate plus nanoweb layer composite on a suitable support structure such as a retainer at the neck of a bag, or a support structure can be located in the interior of the bag. Such supports can be formed from linear members in the form of a wound wire or cage-like structure. Alternatively, the support can comprise a perforated ceramic or metal structure that mimics the shape of the bag. If the support structure contacts the filter substrate over a significant fraction of its surface area, the support structure should be permeable to the passage of air through the structure and should provide no incremental increase in pressure drop over the filter bag. Such support structures can be formed such that they contact the entirety of the interior of the filter bag and maintain the filter bag in an efficient filtration shape or confirmation.

A process for combining the nanoweb layers with the substrate to produce the present composite structure is not specifically limited. The nanofibers of the nanoweb layer can be physically entwined in the substrate layer, or they can be bonded by inter-fusion of the fibers of the nanoweb layer with those of the substrate, for example by thermal, adhesive or ultrasonic lamination or bonding.

Thermal methods for bonding the substrate layer to the nanoweb layer or a nanoweb plus substrate layer include calendering. "Calendering" is the process of passing a web through a nip between two rolls. The rolls may be in contact with each other, or there may be a fixed or variable gap between the roll surfaces. Advantageously, in the calendering process, the nip is formed between a soft roll and a hard roll. The "soft roll" is a roll that deforms under the pressure applied to keep two rolls in a calender together. The "hard roll" is a roll with a surface in which no deformation that has a significant effect on the process or product occurs under the pressure of the process. An "unpatterned" roll is one which has a smooth surface within the capability of the process used to manufacture them. There are no points or patterns to deliberately produce a pattern on the web as it passed through the nip, unlike a point bonding roll. The hard roll in the process of calendering used in the present invention can be patterned or unpatterned.

Adhesive lamination can be carried out in conjunction with calendering or by application of pressure by other means to the laminate in the presence of a solvent based adhesive at low temperatures, for example room temperature. Alternatively a hot melt adhesive can use used at elevated temperatures. One skilled in the art will readily recognize suitable adhesives that can be used in the process of the invention.

Examples of methods of entwining the fibers according to such a physical bonding are needle punch processing and water-jet processing, otherwise known as hydroentangling or spun lacing. Needle punching (or needling) consists essentially of tucking a small bundle of individual fibers down through a carded batt of fibers in such large numbers of penetrations that a cohesive textile structure is formed, as disclosed in U.S. Pat. Nos. 3,431,611 and 4,955,116

For the process of manufacturing the filter of the present invention it is desirable to perform needle punch processing (or water-jet processing) on the high-density layer (substrate) side of the nonwoven fabric. Compared to the case where needle punch processing is performed on the low-density layer (nanoweb) side, needle punch processing on the high-density layer side can suppress collapse or deformation of the pores accompanied by intertwining, as well as undesirable widening of the pore size, thereby suppressing lowering of the initial cleaning efficiency with respect to smaller particles. It is preferable to set the number of needles (the number for penetration) per unit area in the range from about 40 to about 100 perforations/cm$^2$, in order to suppress undesirable widening of the pore diameter, and to perform sufficient intertwining operation. Further, no more than about 25% of the surface area of the low density layer should be perforated.

The as-spun nanoweb comprises primarily or exclusively nanofibers, advantageously produced by electrospinning, such as classical electrospinning or electroblowing, and in certain circumstances, by meltblowing or other such suitable processes. Classical electrospinning is a technique illustrated in U.S. Pat. No. 4,127,706, wherein a high voltage is applied to a polymer in solution to create nanofibers and nonwoven mats. However, total throughput in electrospinning processes is too low to be commercially viable in forming heavier basis weight nanowebs.

The "electroblowing" process is disclosed in World Patent Publication No. WO 03/080905. A stream of polymeric solution comprising a polymer and a solvent is fed from a storage tank to a series of spinning nozzles within a spinneret, to which a high voltage is applied and through which the polymeric solution is discharged. Meanwhile, compressed air that is optionally heated is issued from air nozzles disposed in the sides of, or at the periphery of the spinning nozzle. The air is directed generally downward as a blowing gas stream which envelopes and forwards the newly issued polymeric solution and aids in the formation of the fibrous web, which is collected on a grounded porous collection belt above a vacuum chamber. The electroblowing process permits formation of commercial sizes and quantities of nanowebs at basis weights in excess of about 1 gsm, even as high as about 40 gsm or greater, in a relatively short time period.

A substrate can be arranged on the collector so as to collect and combine the nanofiber web spun on the substrate. Examples of the substrate may include various nonwoven cloths, such as meltblown nonwoven cloth, needle-punched or spunlaced nonwoven cloth, woven cloth, knitted cloth, paper, and the like, and can be used without limitations so long as a nanofiber layer can be added on the substrate. The nonwoven cloth can comprise spunbond fibers, dry-laid or wet-laid fibers, cellulose fibers, melt blown fibers, glass fibers, or blends thereof. Alternatively, the nanoweb layer can be deposited directly onto the felt substrate.

It can be advantageous to add known-in-the-art plasticizers to the various polymers described above, in order to reduce the $T_g$ of the fiber polymer. Suitable plasticizers will depend upon the polymer to be electrospun or electroblown, as well as upon the particular end use into which the nanoweb will be introduced. For example, nylon polymers can be plasticized with water or even residual solvent remaining from the electrospinning or electroblowing process. Other known-in-the-art plasticizers which can be useful in lowering polymer $T_g$ include, but are not limited to aliphatic glycols, aromatic sulphanomides, phthalate esters, including but not limited to those selected from the group consisting of dibutyl phthalate, dihexl phthalate, dicyclohexyl phthalate, dioctyl phthalate, diisodecyl phthalate, diundecyl phthalate, didodecanyl phthalate, and diphenyl phthalate, and the like. The *Handbook of Plasticizers*, edited by George Wypych, 2004 Chemtec Publishing, incorporated herein by reference, discloses other polymer/plasticizer combinations which can be used in the present invention.

TEST METHODS

In the non-limiting examples that follow, the following test methods were employed to determine various reported characteristics and properties. ASTM refers to the American Society of Testing Materials. ISO refers to the International Standards Organization. TAPPI refers to Technical Association of Pulp and Paper Industry.

Filtration Efficiency, Pressure Drop and Cycle Time were measured according VDI 3926, the text of which is incorporated herein by reference.

According to VDI 3926, the filtration efficiency (also called dust leakage) is measured in micrograms per cubic meter, pressure drop in Pascal (Pa) and cycle time is measured in seconds. The filtration efficiency represents the amount of dust passing through the filter. The pressure drop is the differential pressure between the 2 faces of the filters. The cycle time is the duration between 2 pulses to release the dust cake. When a certain pressure drop is obtained (in VDI 3926 the maximum pressure drop is set at 1000 Pa) a reverse flow pulse is automatically created. The VDI 3926 procedure is based on an initial 30 cycles, followed by 10,000 cycles to simulate filter aging, and finally another 30 cycles. The filtration efficiency, pressure drop and cycle time are measured at the end of the final cycles.

Air Permeability is measured according to ISO 9237, and is reported in units of l/dm$^2$/min. The basis wt was measured according to ISO 3801

Basis Weight of the web was determined by ASTM D-3776, which is hereby incorporated by reference and reported in g/m$^2$.

Fiber Diameter was determined as follows. Ten scanning electron microscope (SEM) images at 5,000.times. magnification were taken of each nanofiber layer sample. The diameter of eleven (11) clearly distinguishable nanofibers were measured from the photographs and recorded. Defects were not included (i.e., lumps of nanofibers, polymer drops, intersections of nanofibers). The average (mean) fiber diameter for each sample was calculated.

Tensile Strength was measured according to ASTM D5035-95, "Standard Test Method for Breaking Force and Elongation of Textile Fabrics (Strip Method)" and was reported in kg/cm$^2$.

EXAMPLES 1-5

In order to test the thermal stability of the nanowebs, nanowebs were produced with a basis weight of 15 grams per square meter (gsm) spun from polyamide PA 6/6 (Zytel 3218, DuPont, Wilmington, Del.) nanofiber using the process of World Patent Publication No. WO 03/080905. Mean fiber diameter was about 400 nm. Hand samples (20 cm×25 cm) were suspended in a forced circulation oven at 140° C. A sample was removed daily and examined for color and shrinkage, and tested for tensile strength and elongation. Table 1 summarizes the samples and levels of antioxidant used, and color after 21 days of aging at 140° C. The antioxidant used was N,N'-hexamethylene bis(3,5-di-tert-butyl-4-hydroxyhydrocinnamamide (Irganox 1098, Ciba, Tarrytown, N.Y.) or Copper Bromide (PolyAD 1932, Supplier).

Shrinkage was measured by measuring the length of one side of the sample and expressing it as a percentage of the original sample length.

TABLE 1

| Sample | AO Type | AO level % of polymer | Color after 21 days | Shrinkage after 21 days (%) |
|---|---|---|---|---|
| 1 | Irganox 1098 | 0 | Dark Yellow | 88 |
| 2 | Irganox 1098 | 0.75 | Slight Yellow | 96.5 |
| 3 | Irganox 1098 | 1.0 | Very Slight Yellow | 102 |
| 4 | Irganox 1098 | 2.0 | Very Slight Yellow | 97 |
| 5 | PolyAD 1932 | 0.2 | Slight Yellow | 97.5 |

The samples containing antioxidant demonstrated greatly improved resistance to color change on aging, which is believed to represent greatly improved thermal stability over the control sample (sample 1), which contained no antioxidant.

Table 2 shows tensile strength retention as a percentage of initial tensile strength and absolute elongation after aging for 21 days. The initial elongation to break of the unaged samples was averaged to be 23%.

TABLE 2

| Sample | Strength (%) | Elongation (%) |
|---|---|---|
| 1 | 16 | 4 |
| 2 | 88 | 19 |
| 3 | 88 | 16 |
| 4 | 94 | 19 |
| 5 | 80 | 16 |

The samples containing antioxidant showed marked improvements in retention of tensile strength after aging at high temperature, as compared to control sample 1.

Nanoweb samples were also laminated to felts in order to test the thermal stability of the laminates, as described in examples 6-10 below.

EXAMPLES 6-10

Five different nanowebs were produced with a basis wt of ~10 gsm and with 0.75%, 1%, 2% Irganox 1098, 0.2% PolyAd 1932, and no antioxidant respectively. The mean diameter was ~400 nm. The nanowebs were bonded to samples of polyester felts of basis weight 14 oz/yd$^2$ by adhesive lamination as follows.

A discontinuous layer of polyurethane adhesive was applied to one surface of the felt using a gravure roll. The felt and the nanoweb were fed into a nip of two rolls with the adhesive-coated surface of the felt contacting the nanoweb. The roll temperature was 144° C., the nip pressure was 40 pounds per square inch (psi) and the line speed was 3 meters per minute. The composite was rolled up and tested. The control sample with no antioxidant was laminated on a commercial machine. The nip roll temperature was 290° F. and the line speed was 3 meters per minute.

All the samples and the control were tested in an oven at 150° C. for 70 hours and the color was noted at the end.

Table 3 shows the air permeability, basis weight, air permeability, and pressure drop before heat aging. Table 4 shows filtration efficiency and cycle time data before aging, and the color of the nanoweb after aging. Table 5 below shows the filtration efficiency, pressure drop and cycle time measured according to VDI 3926.

TABLE 3

| Sample | AO Level and type. | Total Basis Weight gsm | Permeability | Pressure Drop Pa |
|---|---|---|---|---|
| 6 | 0.75% 1098 | 507 | 43.0 | not available |
| 7 | 1.0% 1098 | 513 | 46.1 | 258 |
| 8 | 2.0% 1098 | 521 | 39.4 | 248 |
| 9 | 0.2% PolyAd | 505 | 43.3 | 330 |
| 10 | 0 | 483 | 69.2 | 268 |

TABLE 4

| Sample | Efficiency Mgm$^{-2}$ | Cycle Time (seconds) | Color |
|---|---|---|---|
| 6 | Not available | Not available | White |
| 7 | 20 | 253 | White |
| 8 | 20 | 296 | White |
| 9 | 30 | 207 | White |
| 10 | 20 | 260 | Light Brown |

The lamination process of webs with Irganox was acceptable and the product shows improved high temperature durability with no deterioration in other properties.

We claim:

1. A bag filter comprising a support structure clothed in a filter bag, the cloth of said filter bag comprising a composite of at least one substrate layer and a first nanoweb layer having a basis weight of greater than about 0.1 gsm bonded thereto in a face-to-face relationship, wherein the nanoweb comprises polyamide nanofibers incorporating an effective amount of an antioxidant.

2. The bag filter of claim 1 in which the antioxidant is selected from the group consisting of a hindered phenol, a copper halide, a phenolic amide, a phenolic ester, an organic salt of copper, a potassium iodide and stearate mixture, a copper acetate and potassium bromide mixture, a hindered amine, a polymeric hindered phenol, a hindered phosphite, and combinations or blends thereof.

3. The bag filter of claim 2, wherein the antioxidant is a hindered phenol.

4. The bag filter of claim 3, wherein the hindered phenol is N,N'-hexamethylene bis(3,5-di-tert-butyl-4-hydroxyhydrocinnamamide).

5. The bag filter of claim 1, wherein the nanoweb is positioned on the upstream side of the filter bag.

6. The bag filter of claim 1, wherein the substrate layer and nanoweb layer remain bonded after the filter has been subjected to VDI 3926 for 30 cycles.

7. The bag filter of claim 1, further comprising a second nanoweb layer bonded to the substrate layer on the face opposite to the face bonded to the first nanoweb layer.

8. The bag filter of claim 7, further comprising a second substrate layer bonded to the second nanoweb layer and located on the upstream side of the filter bag.

9. The bag filter of claim 1, wherein at least one nanoweb layer and at least one substrate layer are bonded by a method selected from the group consisting of ultrasonic bonding, thermal bonding, adhesive bonding, needlepunching and hydroentangling.

10. The bag filter of claim 7, wherein the substrate layer and the nanoweb layer are needle punched with about 40 to 100 perforations/cm$^2$, and 25% or less of the nanoweb layer is perforated.

11. The bag filter of claim 1, wherein each substrate layer independently comprises fiber selected from polyester fiber, carbon fiber, polyimide fiber, glass fiber, and mixtures thereof.

12. A bag filter comprising a support structure clothed in a filter bag, the cloth of said filter bag comprising a composite of a first substrate layer bonded in a face to face relationship to a nanoweb layer having a basis weight of greater than about 0.1 gsm and a second substrate layer bonded to the nanoweb layer and wherein the nanoweb is positioned on the upstream side of the filter bag, wherein the nanoweb comprises polyamide nanofibers incorporating an effective amount of an antioxidant.

13. The bag filter of claim 12, wherein the second substrate layer is positioned in between the nanoweb and the first substrate layer.

14. The bag filter of claim 12, wherein the nanoweb layer is positioned between the first substrate layer and the second substrate layer.

15. The bag filter of claim 12, wherein the substrate layer and nanoweb layer remain bonded after the filter has been subjected to VDI 3926 for 30 cycles.

* * * * *